(12) United States Patent
Kamanina et al.

(10) Patent No.: US 7,700,168 B2
(45) Date of Patent: Apr. 20, 2010

(54) LIQUID CRYSTAL DISPLAY ELEMENT WITH CONDUCTING LAYERS TREATED WITH SURFACE ELECTROMAGNETIC WAVE

(75) Inventors: Natalia Vladimirovna Kamanina, 57-1-185, Novatorov Boulevard, St.-Petersburg, 198216 (RU); Petr Yakovlevich Vasilyev, 78-399, Veteranov Prospekt, St.-Petersburg, 198260 (RU)

(73) Assignees: Samsung Electronics Co., Ltd. (KR); Natalia Vladimirovna Kamanina (RU); Petr Yakovlevich Vasilyev (RU)

( * ) Notice: Subject to any disclaimer, the term of this patent is extended or adjusted under 35 U.S.C. 154(b) by 0 days.

(21) Appl. No.: 11/857,610

(22) Filed: Sep. 19, 2007

(65) Prior Publication Data

US 2008/0075890 A1 Mar. 27, 2008

(30) Foreign Application Priority Data

Sep. 22, 2006 (RU) .............................. 2006133871

(51) Int. Cl.
*C09K 19/02* (2006.01)
*C09K 19/54* (2006.01)
*C09K 19/52* (2006.01)
*G02F 1/1335* (2006.01)
*B82B 1/00* (2006.01)

(52) U.S. Cl. .................... 428/1.1; 428/1.3; 428/1.5; 252/299.01; 252/299.5; 349/177; 977/734; 977/742; 977/773

(58) Field of Classification Search .................. 428/1.1, 428/1.3, 1.5; 252/299.01, 299.5; 349/177; 977/734, 742, 773
See application file for complete search history.

(56) References Cited

OTHER PUBLICATIONS

Kamanina et al., "Fullerene-Containing Liquid Crystal Spatiotemporal Light Modulators with Surface-Electromagnetic-Wave-Treated Conducting Layers", Technical Physics Letters, 2007, vol. 33, No. 1, pp. 8-10.*
Kamanina, "Fullerene-dispersed nematic liquid crystal structures: dynamic characteristics and self-organization processes", Physics Uspekhi 48 (4) 419 - 427 (2005).*
N V Kamanina, Fullerene-Dispersed Nematic Liquid Crystal Structures: Dynamic Characteristics and Self-Organization Processes, Physics-Uspekhi 48(4) 419-427 (2005), 2005 Uspekhi Fizicheskikh Nauk, Russian Academy of Sciences.
V.V. Belyaev, Use of Substrates With Different Surface Microrelief in the Optoelectronics and Information Display Devices, Optic Journal, V. 72, No. 9, pp. 79-85 (2005) (in Russia). See English Abstract.
http://www.astera.ru/displaynews/?id=37795, LCD Manufacturers Seek the Golden Mean. See English Abstract, 2006.
http://www.astera.ru/displaynews/?id=37228, LCD Monitor With TV Tuner From Samsung. See English Abstract, 2006.
http://www.astera.ru/displaynews/?id=38080, Two New LCD Monitors From Iiyama Company. See English Abstract, 2006.
Meadowlark Optics, Custom, Liquid Crystals and Liquid Crystal Tunable Filters http://www.meadowlark.com products/custom.php, 2008.
V.V. Belyaev, World Market of Large Dimension Displays, Electronic Components, No. 10, pp. 18-30 (2004). See English Abstract.
Vasilyev, et al., Fullerene-Containing Liquid Crystal Spatiotemporal Light Modulators With Surface-Electromagnetic-Wave-Treated Conducting Layers. Technique Physics letters vol. 33, No. 1 pp. 9-10, 2007.
R S McEwen, Liquid Crystals, Displays and Devices for Optical Processing, Instrument Science and Technology, J. Phys. E. Sci. Instrum. 20 (1987).
Martin Schadt, Plenary Lecture Linear and non-linear liquid crystal materials, electro-optical effects and surface interactions, Their application in present and future devices, Liquid Crystals, 1993, vol. 14, No. 1, 73-104.
Kamanina, et al., High-Speed Slm With a Photosensitive Polymer Layer, Electronics Letters 2nd Mar. 1995, vol. 31 No. 5, p. 394.
Kamanina, et al., Influence of Operating Conditions and Interface Properties on Dynamic Characteristics of Liquid-Crystal Spatial Light Modulators, Optical and Quantum Electronics 29, 1997.

* cited by examiner

*Primary Examiner*—Shean C Wu
(74) *Attorney, Agent, or Firm*—Cantor Colburn LLP

(57) ABSTRACT

A liquid crystal display element includes two substrates each covered with a transparent conducting layer and having a liquid crystal layer therebetween, in which the liquid crystal layer is a pure nematic electrooptical matrix or sensitized electrooptical mixture with nanoobjects and in which the conducting layers have been treated with a surface electromagnetic wave. The present invention increases a response speed of the liquid crystal display element due to a decrease of the switching time of electrooptical liquid crystal layer up to 1 ms or less; decreases the number of layers in the liquid crystal display element because an alignment layer is absent, and thus increases the transparency of element; decreases a supply voltage amplitude; and increases a possibility to develop different configurations of the liquid crystal display element.

8 Claims, 2 Drawing Sheets

LIQUID CRYSTAL DISPLAY ELEMENT WITH CONDUCTING LAYERS TREATED WITH SURFACE ELECTROMAGNETIC WAVE

This application claims priority to Russian Patent Application No. 2006133871, filed on Sep. 22, 2006, and all the benefits accruing therefrom under 35 U.S.C. § 119, the contents of which in its entirety are herein incorporated by reference.

BACKGROUND OF THE INVENTION

1. Field of the Invention

The present invention relates generally to liquid crystal display elements, and more particularly, to liquid crystal display elements with high speed electrooptical response and conducting layers specially treated with a surface electromagnetic wave.

2. Description of the Related Art

It is well known that properties of registered media, in the development of modern displays, for example, are important for information processing. These properties are responsible for reversible processes, for example, in such materials as liquid crystal that stimulate the development of optical memory devices, real-time laser amplitude-phase correctors and new display elements. In these media, writing, reading, modulation and switching of the information are realized, in particular, with variations of refractive index. The basic unit of these processes is an interface condition between liquid crystal mesophase and orientation of conducting layers. The influence of operating and interface conditions on dynamic characteristics of the liquid crystal registered media has been shown in the following references [1-6]:

[1] R. S. McEwen, "Liquid crystals, displays and devices for optical processing", *J. Phys. B: Sci. Instrum.*, Vol. 20, pp. 364-377 (1987).

[2] M. Schadt, "Linear and non-linear liquid crystal materials, electro-optical effects and surface interactions. Their application in present and future devices", *Liq. Cryst.*, 14, pp. 73-104 (1993).

[3] N. V. Kamanina and N. A. Vasilenko, "High-speed SLM with a photosensitive polymer layer," *Electron. Lett.*, Vol. 31, pp. 394-395 (1995).

[4] N. V. Kamanina and N. A. Vasilenko, "Influence of operating conditions and of interface properties on dynamic characteristics of liquid-crystal spatial light modulators", *Opt. Quantum Electron.*, Vol. 29, No. 1, pp. 1-9 (1997).

[5] N. V. Kamanina, "Fullerene-dispersed liquid crystal structure: dynamic characteristics and self-organization processes", *Physics-Uspekhi*, Vol. 48, No. 4, pp. 419-427 (2005).

[6] V. V. Belyaev, <<Using substrate with different surface microrelief in the optoelectronics and information processing>>, *Optich. Zhurn.*, Vol. 72, No. 9, c. 79-85 (2005). The authors of the above references have clearly demonstrated the possibilities to improve the dynamic parameters of the devices by changing geometric dimensions of the structure, characteristics of the supply voltage, changing the delay between applied supply voltage and laser pulse, optimizing the dynamic and spectral range of light irradiation, modifying the physical-chemical properties of nematic liquid crystal ("nematic LC"), applying the substrate with different surface microrelief, etc. A weak point of the references mentioned above, however, is the presence of an additional alignment layer in a complicated sandwich structure of the liquid crystal display element. The additional alignment layer decreases the transparency of the device and thus requires a sufficiently increased applied voltage.

Up to now, the question of improving the dynamic relaxation processes has been an open question. It is well known that the relaxation processes are responsible for the speed (e.g., high-speed switching) of the liquid crystal systems such as an electrooptical response of display elements. This problem is investigated in the present disclosure.

It should be noticed, that when different technology improvements have been used, the switching parameters of current display elements of different industry companies are in a range of about 4 milliseconds to about 16 milliseconds (ms). For example, see the following references [7-10]:

[7] http://www.astera.ru/displaynews/?id=37795 ("Про ИзвоДИтеЛИ ЖК-ДИсПЛеев ИıДут"3о Лотую сереДИну").

[8] http://www.astera.ru/displaynews/?id=37228 ("LC-monitor with TV-tuner from Samsung").

[9] http://www.astera.ru/displaynews/?id=38080 ("Two new LCD-monitors from IIYAMA company".

[10] htpp://www.meadowlark.com ("Custom liquid crystal capabilities").

For example, in reference [8] the switching parameters of a typical nematic LC have been indicated, which have been placed in a range of about 4 ms to about 8 ms and used by the assignee of the present application. It should be mentioned, that a thickness of electrooptical layers used in references [8 and 11] (e.g., [11] V. V. Belyaev, "Universal market of large dimension display", *Electronic components*, No. 10, c. 18-30 (2004)) has been placed in a range of about 3 micrometers to about 4 micrometers. To decrease the switching times of electrooptical response, unique electric schemes and synchronizing process between electrical voltage and laser pulse, as well as the smectic LC, have been applied. However, alignment of smectic LC layers has been observed to be problematic. Moreover, the smectic LC structures are very expensive because they contain many components. The problems mentioned above retard the development and industrial application of ferroelectric liquid crystal displays ("LCDs").

The method proposed in a reference [12] (e.g., [12] P. Ya. Vasilyev, N. V. Kamanina, "Fullerene-containing liquid crystal spatial light modulator with conducting layers treated by surface electromagnetic wave", *ZhTF Lett.*, T. 33, No. 1, c. 17-22 (2007)) can be considered as a new step to improve the switching parameters of a liquid crystal display element via decreasing the relaxation time of LC mesophase. In this reference [12], the experimental realization of a thin nematic layer (e.g., thickness of about 10 micrometers to about 12 micrometers) has been shown, which provide a complete cycle switch-on/switch-off duration time of 1 ms. The authors of the reference [12] have used the traditional nematic LC from cyanobiphenyl group, as well as having applied the optimized twisted nematic ("TN") LC with low conductivity. The reference [12] can be considered as a prototype of the present invention. However, a weak point of this prototype includes connection using only a planar configuration of the display element. Nevertheless, it should be mentioned that these switching characteristics of the nematic LC display element have not been found in the prior art up to now.

BRIEF SUMMARY OF THE INVENTION

The present invention provides a liquid crystal display element including two substrates each covered with a transparent conducting layer; and a liquid crystal layer between the two substrates, wherein the liquid crystal layer is a pure nematic electrooptical matrix or sensitized electrooptical mixture with nanostructures, and the conducting layer is treated with a surface electromagnetic wave.

In an exemplary embodiment, the liquid crystal layer is sensitized with 1 wt. % or less of the nanostructures.

In an exemplary embodiment, the nanostructures may include fullerenes $C_{60}$ or $C_{70}$, single or multi wall carbon nanotubes or nanoparticles to sensitize the matrix liquid crystal media.

In an exemplary embodiment, a liquid crystal material of the liquid crystal layer has positive optical ($\Delta n>0$) and dielectric ($\Delta\epsilon>0$) anisotropy.

In an exemplary embodiment, a switching time of the electrooptical liquid crystal layer is 1 ms or less.

In an exemplary embodiment, in the proposed liquid crystal display element the quasi-continues slit-like $CO_2$ laser with p-polarizes irradiation at wavelength of 10.6 micrometers and power of 30 W has been applied as the source to generate the surface electromagnetic wave.

In an exemplary embodiment, the surface electromagnetic wave is generated using a pulsed or quasi-continuous $CO_2$ laser with p-polarized irradiation at a wavelength of about 10.6 micrometers and power of about 30 W and a thickness of the skin-layer should be no less than 0.05 micrometers under condition of the surface wave treatment of the conducting layers.

In an exemplary embodiment, the thickness of the electrooptical liquid crystal layer is about 10 micrometers to about 12 micrometers.

BRIEF DESCRIPTION OF THE DRAWINGS

The above and other aspects, features and advantages of the present invention will become readily apparent by reference to the following detailed description when considered in conjunction with the accompanying drawings wherein.

DETAILED DESCRIPTION OF THE INVENTION

Figure 1:
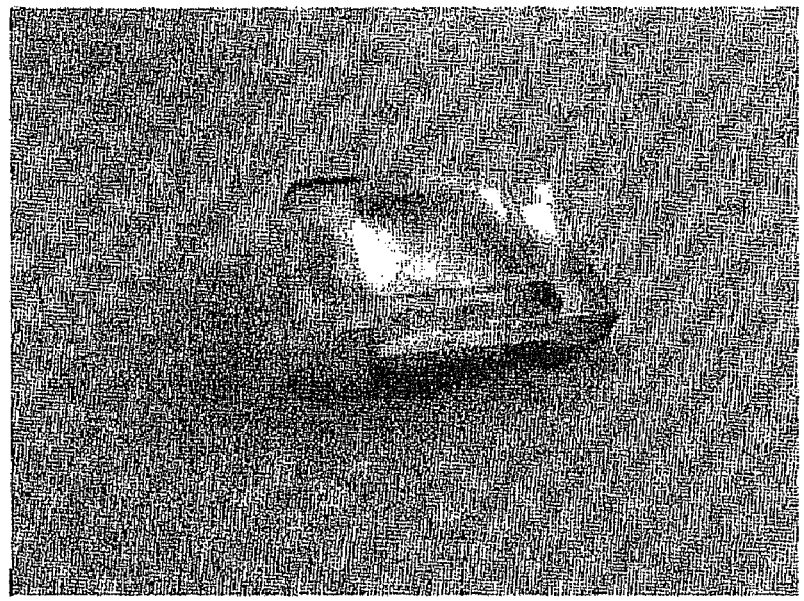
FIG. 1 is a perspective view of an exemplary embodiment of a nematic LC cell of a liquid crystal display element.

The invention is described more filly hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will filly convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
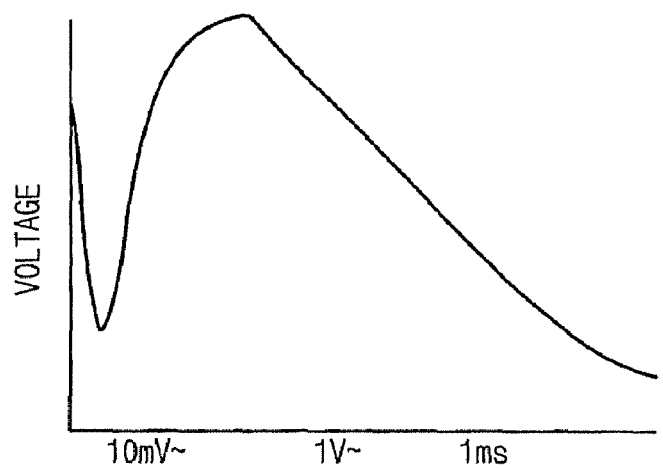
FIG. 2 is a screen view of an ocsillogram illustrating a electrooptical response of the liquid crystal element of FIG. 1 sensitized with nanoobjects.
Figure 3:
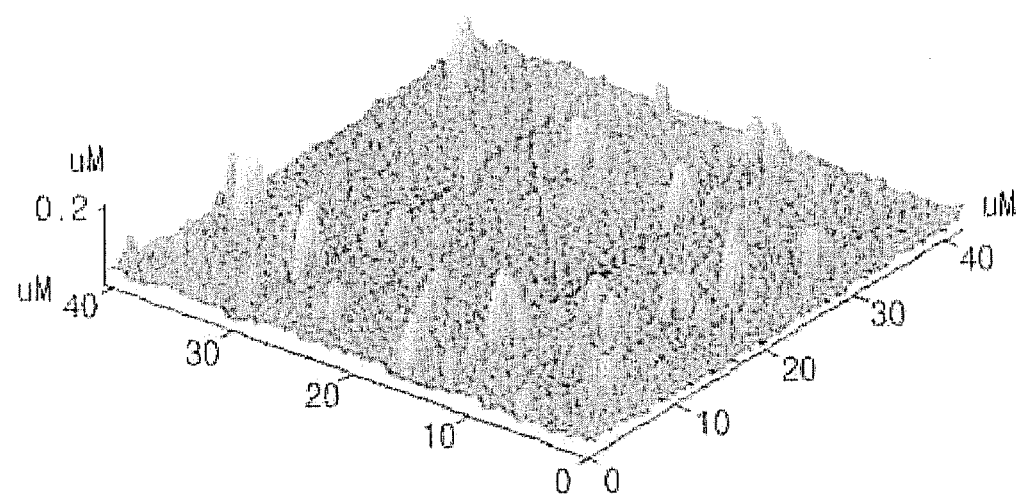
FIG. 3 is an AFM-image of the conducting layer surface of the liquid crystal element of FIG. 1 treated with a surface electromagnetic wave.

FIG. 1 is a perspective view of an exemplary embodiment of a nematic liquid crystal ("LC") cell of a liquid crystal display element. The atomic force microscope ("AFM")image of the conducting layer surface treated with electromagnetic wave. FIG. 2 is a screen view of an ocsillogram illustrating a electrooptical response of the liquid crystal element of FIG. 1 sensitized with nanoobjects. FIG. 2 illustrates the switching response of the LC cells with the conducting layers treated with a surface electromagnetic wave. The dimension at the axis X (time scale) is equal to 1 ms in FIG. 2. FIG. 3 is an AFM-image of the conducting layer surface of the liquid crystal element of FIG. 1 treated with a surface electromagnetic wave. The relief to orient LC molecules is created with the dimension of approximately of 7-15 micrometers.

In exemplary embodiments of the present invention, a small relaxation time is realized from organic liquid crystal molecules from a wide class of nematic liquid crystals, which can be chosen. It should be mentioned that these materials may be pure or sensitized with nanostructures. In exemplary embodiments, the nanostructures may be applied as fullerenes or nanotubes. For example, the nanostructures may include fullerenes $C_{60}$ or $C_{70}$, single or multi wall carbon nanotubes or nanoparticles.

To reveal the small relaxation time, the conducting layer should be previously treated with a surface electromagnetic wave. This procedure changes the dielectric anisotropy at the interface and drastically provokes the decrease in relaxation time. A thickness of the conducting layers is about 0.05 micrometers or less during treatment thereof by the surface electromagnetic wave. The changed dielectric anisotropy at the interface stimulates a 1 millisecond (ms) or less response time, as evidenced by the new nematic display element due to a decrease of the switching time of electrooptical liquid crystal layer. A thickness of the electrooptical liquid crystal layer is about 10 micrometers to about 12 micrometers in exemplary embodiments.

From a technology point of view, the surface wave treatment of the conducting layers of LC cell stimulates the development of a new promising relief to align LC molecules with better advantage. From a physical point of view, the interface conditions (e.g., on the interface: solid-liquid crystal) have been changed, which provoke the change in dielectric and optical anisotropy. As a result, relaxation time of LC mesophase has been decreased up to 1 millisecond (ms) or less.

Thus, after the surface electromagnetic wave treatment of the conducting layers of LC cells, the switching parameters can be improved by up to 10 times or more. Therefore, the temporal characteristics of the electrooptical response are comparable with those revealed in promising smectic liquid crystals, as the number of layers and the supply voltage amplitude can be decreased in the new LC element of the present invention.

The nematic LC material, pure or doped with nanostructures (for example, fullerenes or nanotubes), should be placed between two quartz or glass substrates coated with conducting layers (for examples, indium tin oxide ("ITO").

To create the geometric and potential relief on the surface, the conducting layers should be previously treated with a surface electromagnetic wave. A pulsed or quasi-continuous $CO_2$ laser may be used to generate such a surface wave. Among them, a quasi-continuous p-polarized $CO_2$-laser at a wavelength of about 10.6 micrometers and about 30 W of power can be chosen as a source for generating the surface electromagnetic wave. When treating the conducting layers with the surface electromagnetic wave, the thickness of each conducting layer should be 0.05 micrometers or less.

A pulsed supply voltage should be used to drive the nematic LC cell mentioned above as a display element. The visible range laser or white diode beam can be used to investigate the temporal and modulation characteristics of the nematic LC cell as a promising element of new display devices.

Industrial applicability is connected both with the technology of treatment of the conducting layers and the elimination of an additional alignment layer, as well as with facilitating control of the nematic LC element. Conventional techniques known in the art may be used to control the voltage and light beam intensity. Moreover, the structure is based on a conventional nematic LC system such as 5CB, E7 (BDH), TN LC. An electrooptical component of an exemplary LC display element can be pure or sensitized with nanoobjects, such as fullerenes, nanotubes and/or nanoparticles, for example. Moreover, an exemplary LC display element consists of an electrooptical component based on nematic mixtures, it is not based on smectic LC structures, and the alignment layer can be eliminated. As a result, the new LC display element of the present invention is less expensive than the smectic LC structure, operates under wide spectral and energy ranges, and requires a relatively low control voltage for its operation.

Thus, the technical result and advantages of the present invention include the following: the decrease of the relaxation time has been obtained with the aim to optimize the process of the electrooptical response switching time of the pure and sensitized nanoobjects liquid crystal structures. Hence, the speed enhancement of the new display element is obtained when the alignment layer has been eliminated and conducting layers have been treated with a surface electromagnetic wave. Firstly, this provides a decrease of the relaxation time of a nematic LC mesophase, essentially by a factor of 10. As a result, the speed of the LC display can be drastically increased. Secondly, the number of layers is decreased due to elimination of the alignment layer. This increases the transparency of the LC element and provides the orientation of the LC mesophase due to the unique treatment of the conducting layers with a surface electromagnetic wave. Thirdly, the supply voltage amplitude can be decreased from about 30-50 Volts to about 7-15 Volts due to displacement of the voltage between the electrooptical layer and the conducting layer without consideration of the high conductivity of the alignment layer. Fourthly, under the exemplary method described above, (e.g., concerning the special treatment of the conducting layers), the different configuration of LC-elements (in which splay (S-), bend (B-) and twist (T-)effects have been realized) have been developed.

Having described the exemplary embodiments of the present invention and its advantages, it is noted that various changes, substitutions and alterations can be made herein without departing from the spirit and scope of the present invention as defined by the appended claims.

What is claimed is:

1. A liquid crystal display element comprising:
   two substrates each covered with a transparent conducting layer, the transparent conducting layer having geometric and potential relief on a surface; and
   a liquid crystal layer between the two substrates,
   wherein the liquid crystal layer is one of a pure nematic electrooptical matrix and sensitized electrooptical mixture with nanostructures, and the transparent conducting layer is treated with a surface electromagnetic wave to generate the relief.

2. The liquid crystal display element of claim 1, wherein the liquid crystal layer is sensitized with 1 wt. % or less of the nanostructures.

3. The liquid crystal display element of claim 1, wherein the nanostructures comprise fullerenes $C_{60}$ or $C_{70}$, single or multi wall carbon nanotubes or nanoparticles.

4. The liquid crystal display element of claim 1, wherein a liquid crystal material of the liquid crystal layer has positive optical and dielectric anisotropy, $\Delta n > 0$ and $\Delta \epsilon > 0$, respectively.

5. The liquid crystal display element of claim 1, wherein a switching time of the electrooptical liquid crystal layer is 1 ms or less.

6. The liquid crystal display element of claim 1, wherein the surface electromagnetic wave is generated using a pulsed or quasi-continuous $CO_2$ laser with p-polarized irradiation at a wavelength of about 10.6 micrometers and power of about 30 W.

7. The liquid crystal display element of claim 1, wherein a thickness of the transparent conducting layer is about 0.05 micrometers or less during treatment thereof by the surface electromagnetic wave.

8. The liquid crystal display element of claim 1, wherein the thickness of the electrooptical liquid crystal layer is about 10 micrometers to about 12 micrometers.

* * * * *